US010637037B2

(12) United States Patent
Li et al.

(10) Patent No.: US 10,637,037 B2
(45) Date of Patent: Apr. 28, 2020

(54) BATTERY SEALING DEVICE WITH POLAR ROD HAVING LARGE AND SMALL ENDS

(71) Applicant: Renata AG, Itingen (CH)

(72) Inventors: Mujian Li, Itingen (CH); Huiming Ge, Itingen (CH); Zhengzhong Lyu, Itingen (CH); Jincheng Liu, Itingen (CH)

(73) Assignee: Renata AG, Itingen (CH)

( * ) Notice: Subject to any disclaimer, the term of this patent is extended or adjusted under 35 U.S.C. 154(b) by 0 days.

(21) Appl. No.: 15/780,376

(22) PCT Filed: Dec. 23, 2016

(86) PCT No.: PCT/EP2016/082560
§ 371 (c)(1),
(2) Date: May 31, 2018

(87) PCT Pub. No.: WO2017/109172
PCT Pub. Date: Jun. 29, 2017

(65) Prior Publication Data
US 2018/0358605 A1    Dec. 13, 2018

(30) Foreign Application Priority Data

Dec. 25, 2015 (CN) .................... 2015 2 1091982 U

(51) Int. Cl.
*H01M 2/36* (2006.01)
*H01M 2/08* (2006.01)
(Continued)

(52) U.S. Cl.
CPC ......... *H01M 2/365* (2013.01); *H01M 2/0404* (2013.01); *H01M 2/046* (2013.01);
(Continued)

(58) Field of Classification Search
CPC .... H01M 2/365; H01M 2/046; H01M 2/0417; H01M 2/0404; H01M 2/06; H01M 10/0525; H01M 2/30; H01M 2/08
(Continued)

(56) References Cited

U.S. PATENT DOCUMENTS

2014/0212741 A1    7/2014 Kim

FOREIGN PATENT DOCUMENTS

| CN | 201893422 U | * | 7/2011 |
| CN | 201893422 U |   | 7/2011 |
| JP | 3612629 B2  |   | 1/2005 |

OTHER PUBLICATIONS

International Search Report dated Apr. 6, 2017 in PCT/EP2016/082560 filed Dec. 23, 2016.

* cited by examiner

*Primary Examiner* — Gary D Harris
(74) *Attorney, Agent, or Firm* — Oblon, McClelland, Maier & Neustadt, L.L.P.

(57) ABSTRACT

A battery sealing device, including an upper pressing member, a polar rod, a battery cover plate, and a sealing member. The polar rod includes polar rod large and small ends, and a polar rod connecting plate. The upper pressing member includes an upper pressing through hole matched with the periphery of the polar rod large end. The battery cover plate includes a cover plate through hole; the polar rod large end penetrates through the upper pressing through hole and the cover plate through hole; the upper pressing member arranged above the battery cover plate. The sealing member includes an upper sealing element formed between the upper pressing member and the battery cover plate, an intermediate sealing element formed in the gap between the cover plate through hole and the polar rod large end, and a lower sealing
(Continued)

element formed between the battery cover plate and the polar rod connecting plate.

10 Claims, 3 Drawing Sheets

(51) Int. Cl.
    *H01M 10/0525*    (2010.01)
    *H01M 2/04*    (2006.01)
    *H01M 2/30*    (2006.01)
    *H01M 2/06*    (2006.01)

(52) U.S. Cl.
    CPC ........... *H01M 2/0417* (2013.01); *H01M 2/06* (2013.01); *H01M 2/08* (2013.01); *H01M 2/30* (2013.01); *H01M 10/0525* (2013.01)

(58) Field of Classification Search
    USPC ........................................................ 429/185
    See application file for complete search history.

BATTERY SEALING DEVICE WITH POLAR ROD HAVING LARGE AND SMALL ENDS

CROSS-REFERENCE TO RELATED APPLICATIONS

This is a National phase Application in the United States of International Patent Application PCT/EP2016/082560 filed on Dec. 23, 2016 which claims priority on Chinese patent application No. 201521091982.6 filed on Dec. 25, 2015. The entire disclosure of the above patent applications are hereby incorporated by reference.

FIELD OF THE INVENTION

The present invention relates to the technical field of batteries, in particular to a battery sealing device.

BACKGROUND OF THE INVENTION

The lithium ion batteries have the characteristics of high energy density, capability of being quickly charged and discharged and recycled, and long service life and the like, have become the mainstream of the battery energy market, and are widely applied to civil products and military products.

Along with the development of the society, people have higher demands on the performance of the lithium ion batteries, in particular, the reliability and safety of the lithium ion batteries. As an important factor influencing the reliability and safety of the batteries, a battery sealing component is a technical difficulty and key point in a production process of the batteries.

Along with the arising of wearable products, the demands on miniaturization and diversification of the battery products are more and more obvious, meanwhile since the demand on the cruising ability of the electronic device is higher and higher, under the premise of ensuring the performances of the batteries, the battery manufacturers are required to improve the internal actual use space of the batteries as high as possible to improve the energy density of the batteries.

At present, a common battery sealing component adopts a glass cement paper or ceramic sealing component, but it is discovered in the large quantity use process that under a high voltage chemical system environment, the glass or ceramic has an electrochemical corrosion phenomenon and a self discharging phenomenon, leading to a sealing gap, as a result, electrolyte is leaked from a polar rod terminal under the action of an internal pressure, and the long circulation service life of the battery cannot be achieved; secondly, the glass and ceramic are easy to fracture and greater in hardness, when the batteries are vibrated, the glass and ceramic are easy to break, or even fall off to cause failure in the batteries; and in addition, since the polar rod and a cover plate are made of a metal material, when the glass or ceramic sealing component is adopted to seal metal, the process is complex and the manufacture cost is high.

The Chinese patent application document with application number 201220747613.8 discloses a sealing component of a lithium ion battery capacitor, in the application document, an insulating material having hot melting property and electrolyte corrosion resisting capability is adopted as the material of a sealing metal cover plate and a polar rod, its cover plate is provided with a liquid injection hole, in order to perform second sealing and ensuring sealing reliability after liquid injection, the height of the liquid injection hole 71 exceeds the thickness of a battery cover plate, such that a larger height h in FIG. 1 needs to be reserved to facilitate subsequent sealing, meanwhile, in order to protect internal insulativity of the battery, an insulation gasket 72 needs to be added below the liquid injection hole, but in this way, in one aspect, the whole component structure cannot be integrated to influence the sealing property to some extent, and in the other aspect, the total thickness H of the sealing component is inevitably increased, and the total thickness H of such type of sealing component is relatively thick and reaches about 4.0 mm. Under the premise that the sealing component in the application document cannot ensure the sealing property, the sealing component is thinned, the thickness of the whole sealing component cannot be reduced, therefore, the use rate of the internal space of the battery cannot be increased, and the energy density of the battery products cannot be improved.

SUMMARY OF THE INVENTION

The present invention aims to provide a battery sealing device with higher sealing property, simpler structure and lower cost.

The battery sealing device comprises an upper pressing member, a polar rod, a battery cover plate and a sealing member; the polar rod comprises a polar rod large end, a polar rod small end and a polar rod connecting plate; the polar rod larger end is connected to the upper surface of the polar rod connecting plate, and the polar rod small end is connected to the lower surface of the polar rod connecting plate; the upper pressing member is provided with an upper pressing through hole which is matched with the periphery of the polar rod large end; the battery cover plate is provided with a cover plate through hole; the polar rod large end penetrates through the upper pressing through hole and the cover plate through hole; the upper pressing member is arranged above the battery cover plate; the sealing member comprises an upper sealing element formed between the upper pressing member and the battery cover plate, an intermediate sealing element formed in the gap between the cover plate through hole and the polar rod large end and a lower sealing element formed between the battery cover plate and the polar rod connecting plate; and the upper sealing element, the intermediate sealing element and the lower sealing element and the cover plate through hole and the upper and lower surfaces of the battery cover plate are formed into an integral structure by plastic injection molding.

Further, the polar rod connecting plate is provided with one or more bulges on the contacting surface of the polar rod connecting plate with the sealing member.

Further, the contacting surface between the battery cover plate and the sealing member is provided with one or more bulges.

Further, the end parts of the polar rod large end and the polar rod small end are both formed into a coronary structure.

Further, the upper pressing through hole is provided with an upper pressing groove matched with the coronary structure of the polar rod large end.

Further, the polar rod large end is connected with the upper pressing member in a riveting manner.

Further, the sealing device also comprises a polar lug pressing ring, provided with a lower pressing through hole; and the polar rod small end penetrates through the lower pressing through hole and is connected to the polar lug pressing ring in a riveting manner.

Further, the polar rod large end, the polar rod small end and the polar rod connecting plate are of an integral molded structure.

Further, the sealing member also comprises a first peripheral sealing element formed on the periphery of the upper pressing member and a second peripheral sealing element formed on the periphery of the polar rod connecting plate.

The battery sealing device of the present invention has the following beneficial effects:

1) according to the battery sealing device of the present invention, while the performances of the battery products are ensured and the sealing property of the batteries is ensured, the structure of the battery sealing device is simplified, the cost of the battery sealing device is reduced, and meanwhile the total thickness of the battery sealing device is effectively reduced, the use rate of the internal space of the battery is effectively improved, such that the energy density of the batteries is improved, which it is favorable for the development and application of miniaturized battery products.

2) the present invention adopts the sealing elements to seal the battery cover plate and the polar rod, the riveting manner is adopted to fully seal the polar rod with the upper pressing member as well as with the battery cover plate, the sealing property is improved; a sealant is adopted for its low hardness, thereby, it is not easy to fall off, and the sealing gap is also avoided to prevent leakage of the electrolyte.

3) the contact surface(s) between the polar rod connecting plate and/or the battery cover plate and the sealing member is/are provided with one or more bulges, such that when the battery sealing device is assembled, the bulges on the polar rod connecting plate and the battery cover plate are embedded into the sealing member due to the action of a riveting impact force, therefore, the binding force between the polar rod, the battery cover plate and the sealing member is increased, further improving the sealing property of the battery sealing device.

BRIEF DESCRIPTION OF THE DRAWINGS

Other features and advantages of the invention will appear more clearly upon reading the following description of several embodiments of the invention, given simply by way of illustrative and non-limiting examples, and the annexed Figures, among which.

Explanations to reference signs: 1 is upper pressing member, 11 is upper pressing through hole, 12 is upper pressing groove, 2 is polar rod, 21 is polar rod large end, 22 is polar rod small end, 23 is polar rod connecting plate, 3 is battery cover plate, 4 is sealing member, 41 is upper sealing element, 42 is intermediate sealing element, 43 is lower sealing element, 44 is first peripheral sealing element, 45 is second peripheral sealing element, 5 is polar lug pressing ring, 51 is lower pressing through hole, 6 is bulges, 71 is liquid injection hole, and 72 is insulating gasket.

DETAILED DESCRIPTION OF A PREFERRED EMBODIMENT

The battery sealing device of the present invention is further described in detail in combination with specific embodiments and drawings.

Figure 2:
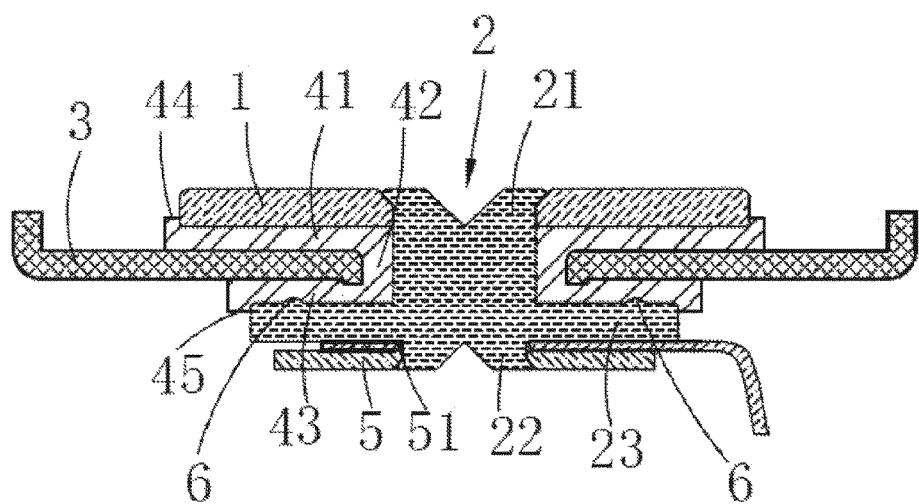
FIG. 2 is a structural sectional diagram of a battery sealing device of one embodiment.
Figure 3:
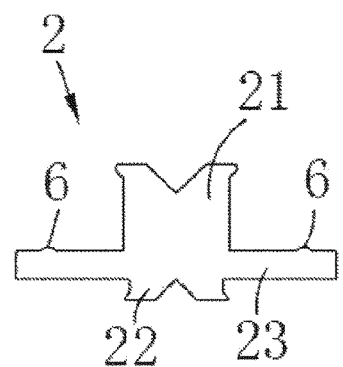
FIG. 3 is a schematic diagram of a polar rod of one embodiment.
Figure 6:
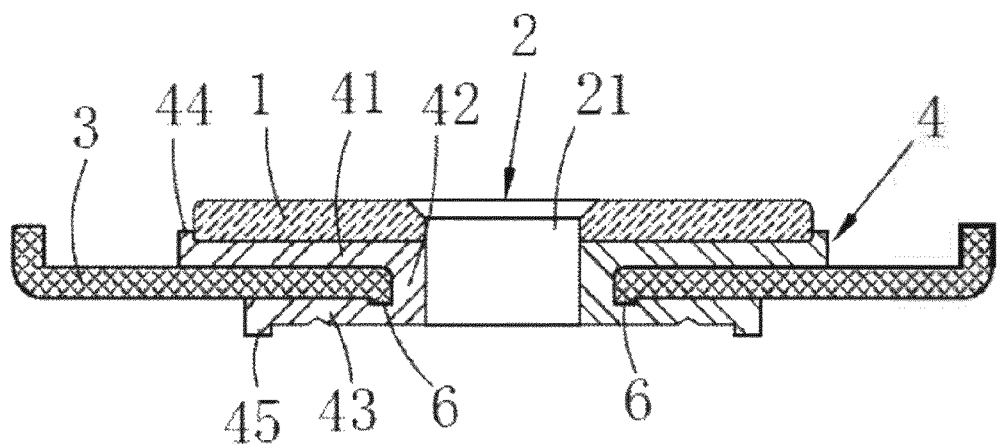
FIG. 6 is a schematic diagram that a sealing member and a battery cover plate of one embodiment are assembled.

As shown in FIG. 2 and FIG. 6, in a preferred embodiment, the battery sealing device of the present invention comprises an upper pressing member 1, a polar rod 2, a battery cover plate 3 and a sealing member 4. As shown in FIG. 3, the polar rod 2 comprises a polar rod large end 21, a polar rod small end 22 and a polar rod connecting plate 23. The polar rod large end 21 and the polar rod small end 22 are both cylindrical, and the diameter of the polar rod large end 21 is larger than that of the polar rod small end 22. The polar rod large end 21 is connected to the upper surface of the polar rod connecting plate 23, and the polar rod small end 22 is connected to the lower surface of the polar rod connecting plate 23. The polar rod large end 21, the polar rod small end 22 and polar rod connecting plate 23 are of an integrally molded structure.

Figure 4:
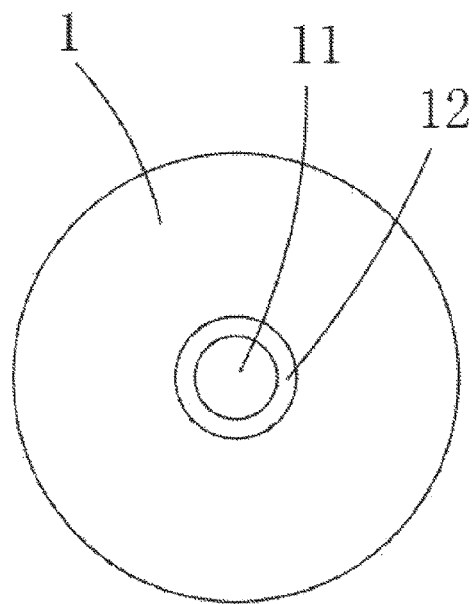
FIG. 4 is a schematic diagram of an upper pressing member of one embodiment.
Figure 5:
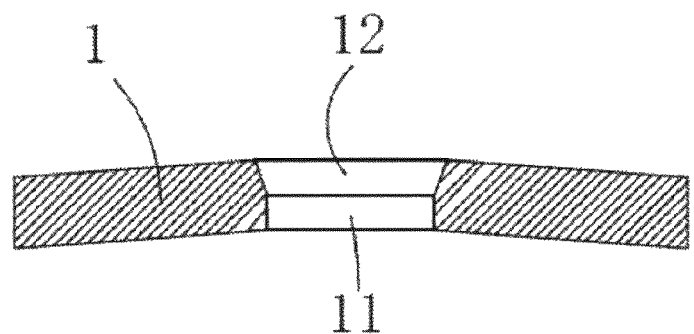
FIG. 5 is a structural sectional diagram of the upper pressing member in FIG. 4.

As shown in FIGS. 4 and 5, the upper pressing member 1 is approximately in a round plate shape. The upper pressing member 1 is provided with an upper pressing through hole 11. The shape and size of the upper pressing through hole 11 are matched with the periphery of the polar rod large end 21. The polar rod large end 21 is connected to the upper pressing member 1 in a riveting manner, and the end part of the upper pressing member 1 is formed into a coronary structure due to a riveting impact force. The upper pressing through hole 11 is provided with an upper pressing groove 12 matched with the coronary structure of the polar rod large end 21.

As shown in FIG. 6, the battery cover plate 3 is provided with a cover plate through hole. The central axis of the cover plate through hole is the same as that of the upper pressing through hole 11. The polar rod large end 21 penetrates through the upper pressing through hole 11 and the cover plate through hole, and the upper pressing member 1 is arranged above the battery cover plate 3. The sealing member 4 comprises an upper sealing element 41 formed between the upper pressing member 1 and the battery cover plate 3, an intermediate sealing element 42 formed in the gap between the cover plate through hole and the polar rod large end 21, and a lower sealing element 43 formed between the battery cover plate 3 and the polar rod connecting plate 23, wherein the upper sealing element 41, the intermediate sealing element 42 and the lower sealing element 43 as well as the cover plate through hole and the upper and lower surfaces of the battery cover plate 3 are injection-molded into an integral structure. The sealing member 4 may be embodied by a sealant. The sealing member 4 also comprises a first peripheral sealing element 44 formed on the periphery of the upper pressing member 1 and a second peripheral sealing element 45 formed on the periphery of the polar rod connecting plate 23, so as to further improve the sealing property of the battery sealing device. The present invention adopts the sealing elements to seal the battery cover plate 3 and the polar rod 2, and the riveting manner is adopted to seal the polar rod 2 against the upper pressing member 1 as well as against the battery cover plate 3, and thus full sealing is realized, and the sealing property is improved; the sealant is adopted for its low hardness and difficulty in falling off, and the sealing gap is also avoided to prevent leakage of the electrolyte.

Figure 1:
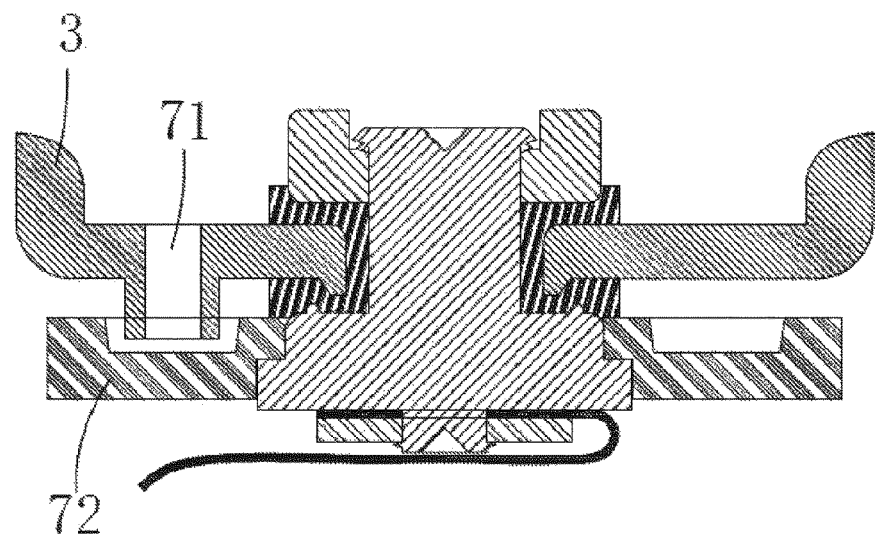
FIG. 1 is a structural sectional diagram of a sealing component for a lithium ion battery capacitor in prior art.

The battery sealing device of the present invention is smart in design, the battery cover plate 3 is not provided with a liquid injection hole, such that it is unnecessary to reserve a relative large height h for subsequent liquid injecting and sealing like the prior art in FIG. 1, and there is no need to arrange an insulating gasket, therefore, according to the battery sealing device of the present invention, the total thickness H of the battery sealing device is reduced, such that under the premise of ensuring the performances of battery products and the sealing property of the batteries, the use rate of the internal space of the battery products is improved, and the energy density of the batteries is further improved. In the other aspect, the battery sealing device of the present invention can be formed into an integral structure, the structure is simpler, and the cost is lower, which is favorable for the development and application of miniaturized lithium ion batteries.

Further, the contacting surface(s) between the polar rod connecting plate 23 and/or the battery cover plate 3 and the sealing member 4 is/are provided with one or more bulges 6. When the battery sealing device is assembled, the bulges 6 on the polar rod connecting plate 23 and the battery cover plate 3 are embedded into the sealing member 4 due to the action of a riveting impact force, therefore, the binding force between the polar rod 2, the battery cover plate 3 and the sealing member 4 is increased, further improving the sealing property of the battery sealing device.

The battery sealing device of the present invention further comprises a polar lug pressing ring 5, provided with a lower pressing through hole 51; and the shape and size of the lower pressing through hole 51 are matched with the periphery of the polar rod small end 22. The polar rod small end 22 penetrates through the lower pressing through hole 51 and is connected to the polar lug pressing ring 5 in a riveting manner. The end part of the polar lug pressing ring 5 is formed into a coronary structure due to a riveting impact force.

The battery sealing device is explained in detail by the following example.

The upper pressing member 1 adopts a stainless steel material with a model number of SUS430, the polar rod 2 adopts a pure aluminum material, the sealing member 4 adopts a sealant, in particular the insulating material, soluble polytetrafluoroethylene, having hot melting property and electrolyte corrosion resistance, the battery cover plate 3 adopts the SUS304 stainless steel material, and the polar lug pressing ring 5 adopts a pure aluminum material. When battery sealing device is assembled, firstly, the sealant, the cover plate through hole, the upper and lower surfaces of the battery cover plate 3 are formed into an integral structure by plastic injection molding, wherein, the thickness of the sealant in the cover plate through hole of the battery cover plate 3 is 0.33 mm, the thickness of the sealant on the upper and lower surfaces of the battery cover plate 3 is 0.35 mm, the polar rod large end 21 sequentially penetrates through the cover plate through hole and the upper pressing through hole 11 to rivet the upper pressing member 1 and the polar rod large end 21 together; then the polar rod small end 22 penetrates through the lower pressing through hole 51 to rivet the polar lug pressing ring 5 and the polar rod small end 22 together. The total thickness of thereby formed battery sealing member 4 is 1.60 mm, compared with the total thickness of 4.0 mm of the battery sealing member 4 in the prior art, under the premise of ensuring the performances of the battery products and the sealing property of the batteries according to the present invention, the total thickness of the battery sealing device is effectively reduced, which is favorable to improve the utilization rate of the internal space of the batteries, therefore, the energy density of the batteries is improved, it is favorable for the development and application of the miniaturized batter products, the structure of the battery sealing device is simplified and the cost of the battery sealing device is reduced.

The terms "first", "second", "third" and "fourth" etc., adopted in the present invention are expressions adopted to facilitate description, and have no special meanings.

Although the description of the present invention is combined with the specific embodiments above, those skilled familiar with the technical field can make many substitutions, modifications and changes according to the content mentioned above, obviously. Therefore, all such substitutions, modifications and changes are contained in the spirit and range of the appended claims.

The invention claimed is:

1. A battery sealing device, comprising:
an upper pressing member;
a polar rod;
a battery cover plate; and
a sealing member;
the polar rod comprises a polar rod large end, a polar rod small end, and a polar rod connecting plate;
the polar rod larger end is connected to an upper surface of the polar rod connecting plate, and the polar rod small end is connected to a lower surface of the polar rod connecting plate;
the upper pressing member includes an upper pressing through hole which is matched with a periphery of the polar rod large end;
the battery cover plate includes a cover plate through hole;
the polar rod large end penetrates through the upper pressing through hole and the cover plate through hole;
the upper pressing member is arranged above the battery cover plate;
the sealing member comprises an upper sealing element formed between the upper pressing member and the battery cover plate, an intermediate sealing element formed in a gap between the cover plate through hole and the polar rod large end, and a lower sealing element formed between the battery cover plate and the polar rod connecting plate; and
the upper sealing element, the intermediate sealing element, the lower sealing element, and the cover plate through hole and the upper and lower surfaces of the battery cover plate are injection-molded into an integral structure,
wherein the sealing device further comprises a polar lug pressing ring, including a lower pressing through hole, and the polar rod small end penetrates through the lower pressing through hole and is connected to the polar lug pressing ring by rivets.

2. The battery sealing device according to claim 1, wherein the polar rod connecting plate includes one or more bulges on a contacting surface of the polar rod connecting plate with the sealing member.

3. The battery sealing device according to claim 1, wherein a contacting surface between the battery cover late and the sealing member includes one or more bulges.

4. The battery sealing device according to claim 1, wherein the end parts of the polar rod large end and the polar rod small end are both formed into a coronary structure.

5. The battery sealing device according to claim 4, wherein the upper pressing through hole includes an upper pressing groove matched with the coronary structure of the polar rod large end.

6. The battery sealing device according to claim 1, wherein the polar rod large end is connected by rivets with the upper pressing member.

7. The battery sealing device according to claim 1, wherein the polar rod large end, the polar rod small end and the polar rod connecting plate are of an integral molded structure.

8. The battery sealing device according to claim 1, wherein the sealing member further comprises a first peripheral sealing element formed on a periphery of the upper pressing member and a second peripheral sealing element formed on a periphery of the polar rod connecting plate.

9. A battery sealing device, comprising:
an upper pressing member;
a polar rod;
a battery cover plate; and
a sealing member;
the polar rod comprises a polar rod large end, a polar rod small end, and a polar rod connecting plate;
the polar rod larger end is connected to an upper surface of the polar rod connecting plate, and the polar rod small end is connected to a lower surface of the polar rod connecting plate;
the upper pressing member includes an upper pressing through hole which is matched with a periphery of the polar rod large end;
the battery cover plate includes a cover plate through hole;
the polar rod large end penetrates through the upper pressing through hole and the cover plate through hole;
the upper pressing member is arranged above the battery cover plate;
the sealing member comprises an upper sealing element formed between the upper pressing member and the battery cover plate, an intermediate sealing element formed in a gap between the cover plate through hole and the polar rod large end, and a lower sealing element formed between the battery cover plate and the polar rod connecting plate; and
the upper sealing element, the intermediate sealing element, the lower sealing element, and the cover plate through hole and the upper and lower surfaces of the battery cover plate are injection-molded into an integral structure,
wherein the polar rod connecting plate includes one or more bulges on a contacting surface of the polar rod connecting plate with the sealing member.

10. A battery sealing device, comprising:
an upper pressing member;
a polar rod;
a battery cover plate; and
a sealing member;
the polar rod comprises a polar rod large end, a polar rod small end, and a polar rod connecting plate;
the polar rod larger end is connected to an upper surface of the polar rod connecting plate, and the polar rod small end is connected to a lower surface of the polar rod connecting plate;
the upper pressing member includes an upper pressing through hole which is matched with a periphery of the polar rod large end;
the battery cover plate includes a cover plate through hole;
the polar rod large end penetrates through the upper pressing through hole and the cover plate through hole;
the upper pressing member is arranged above the battery cover plate;
the sealing member comprises an upper sealing element formed between the upper pressing member and the battery cover plate, an intermediate sealing element formed in a gap between the cover plate through hole and the polar rod large end, and a lower sealing element formed between the battery cover plate and the polar rod connecting plate; and
the upper sealing element, the intermediate sealing element, the lower sealing element, and the cover plate through hole and the upper and lower surfaces of the battery cover plate are injection-molded into an integral structure,
wherein the sealing member further comprises a first peripheral sealing element formed on a periphery of the upper pressing member and a second peripheral sealing element formed on a periphery of the polar rod connecting plate.

* * * * *